(12) United States Patent
Rese

(10) Patent No.: US 10,754,876 B2
(45) Date of Patent: Aug. 25, 2020

(54) CLONING OF A SYSTEM

(71) Applicant: INTERNATIONAL BUSINESS MACHINES CORPORATION, Armonk, NY (US)

(72) Inventor: Joachim Rese, Hockenheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 316 days.

(21) Appl. No.: 15/869,297

(22) Filed: Jan. 12, 2018

(65) Prior Publication Data

US 2019/0220538 A1 Jul. 18, 2019

(51) Int. Cl.
*G06F 16/00* (2019.01)
*G06F 16/27* (2019.01)
*G06F 16/176* (2019.01)
*G06F 16/21* (2019.01)

(52) U.S. Cl.
CPC .......... *G06F 16/275* (2019.01); *G06F 16/176* (2019.01); *G06F 16/214* (2019.01)

(58) Field of Classification Search
None
See application file for complete search history.

(56) References Cited

U.S. PATENT DOCUMENTS

| | | | |
|---|---|---|---|
| 10,353,878 B1* | 7/2019 | Mohen | G06F 16/00 |
| 2003/0088650 A1* | 5/2003 | Fassold | G06F 8/63 |
| | | | 709/220 |
| 2008/0104132 A1* | 5/2008 | Toner | G06F 16/119 |
| 2011/0066593 A1* | 3/2011 | Ahluwalia | G06F 16/2282 |
| | | | 707/624 |
| 2014/0222759 A9 | 8/2014 | Varadharajan et al. | |
| 2015/0205853 A1 | 7/2015 | Ngo | |
| 2016/0210203 A1 | 7/2016 | Kumarasamy et al. | |

* cited by examiner

*Primary Examiner* — Son T Hoang
(74) *Attorney, Agent, or Firm* — Teddi Maranzano, Esq.; Kevin P. Radigan, Esq.; Heslin Rothenberg Farley & Mesiti P.C.

(57) ABSTRACT

Cloning a source system to a target system of a multiple system landscape. A depot is created in an archive by the source system. The depot is assigned a creator ID identifying the source system. One or more data packages are offloaded from the source system to the depot. For each of the data packages, a record is written to an internal control structure of the source system with a package ID and a depot ID. The source system is cloned to the target system. The target system in the form of a physical replicate of the source system is provided with read-access to the archive, which is restricted to data packages for which the cloned internal control structure includes records with data package IDs identifying the data packages and depot IDs identifying the depots including the data packages.

20 Claims, 11 Drawing Sheets

CLONING OF A SYSTEM

BACKGROUND

One or more aspects of the present disclosure relate to the field of electronic data processing, and more specifically, to cloning a source system of a multiple system landscape.

Large online data processing systems often appear as a multiple system landscape, also referred to as a multitier landscape, composed of different systems. A multiple system landscape may, for example, comprise a development system. The development system may be used for developing updates and modifications for a production system. The updates and modifications developed by the development system may be tested in a quality assurance system before they are applied to the production system. Due to business needs or legal regulations, often a large amount of data has to be stored by the production system. Historical data that is less frequently accessed may be offloaded from the production system to an external archive in order to reduce the amount of data stored in the production system and maintenance costs of the production system.

In order to improve the quality of the developed updates and modifications, as well as the accuracy and validity of tests performed, each of the development system and the quality assurance system is to provide an environment which is as similar as possible to the production system, i.e. the system of actual use of the updates and modifications. However, archived data of the production system may not be available in the quality assurance system or development system. Therefore, newly developed updates and modifications may insufficiently take into account archived data. Furthermore, performance tests in the quality assurance system might not be valid to predict performance in the production system. This may in particular be the case if the archive allows online access like, e.g. near-line storage.

SUMMARY

Various embodiments provide a method of cloning a source system of a multiple system landscape to a first target system of the multiple system landscape, as well as a computer program product and a computer system for executing the method as described by the subject matter of the independent claims. Advantageous embodiments are described in the dependent claims. Embodiments of the present invention can be freely combined with each other if they are not mutually exclusive.

Shortcomings of the prior art are overcome and additional advantages are provided through the provision of a computer-implemented method of cloning a system of a multiple system landscape to a first target system of the multiple system landscape. The computer-implemented method includes, for instance, creating, by the source system, a first depot in an archive. The archive is accessible by systems of the multiple system landscape, and the first depot is assigned a first creator ID identifying the source system as a creator of the first depot. The source system is provided with write-access to the archive, the write-access being restricted to depots assigned with the first creator ID. One or more data packages including data of the source system are offloaded to the first depot. For a data package offloaded from the source system to the first depot, a record is written to an internal control structure of the source system. The record comprises a package ID identifying the data package and a first depot ID identifying the first depot. The source system is provided with read-access to the archive, the read-access being restricted to data packages for which the internal control structure of the source system comprises a record with a package ID identifying a respective data package and a depot ID identifying the depot comprising the respective data package. The source system is cloned to the first target system including the internal control structure of the source system. The cloning includes creating a physical replicate of the source system in a form of the first target system. The first target system is provided with read-access to the archive, the read-access being restricted to data packages for which a cloned internal control structure of the first target system includes a record with a data package ID identifying the respective data package and a depot ID identifying the depot comprising the respective data package.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

In the following, embodiments of the invention are explained in greater detail, by way of example only, making reference to the drawings in which.

DETAILED DESCRIPTION

Figure 1:
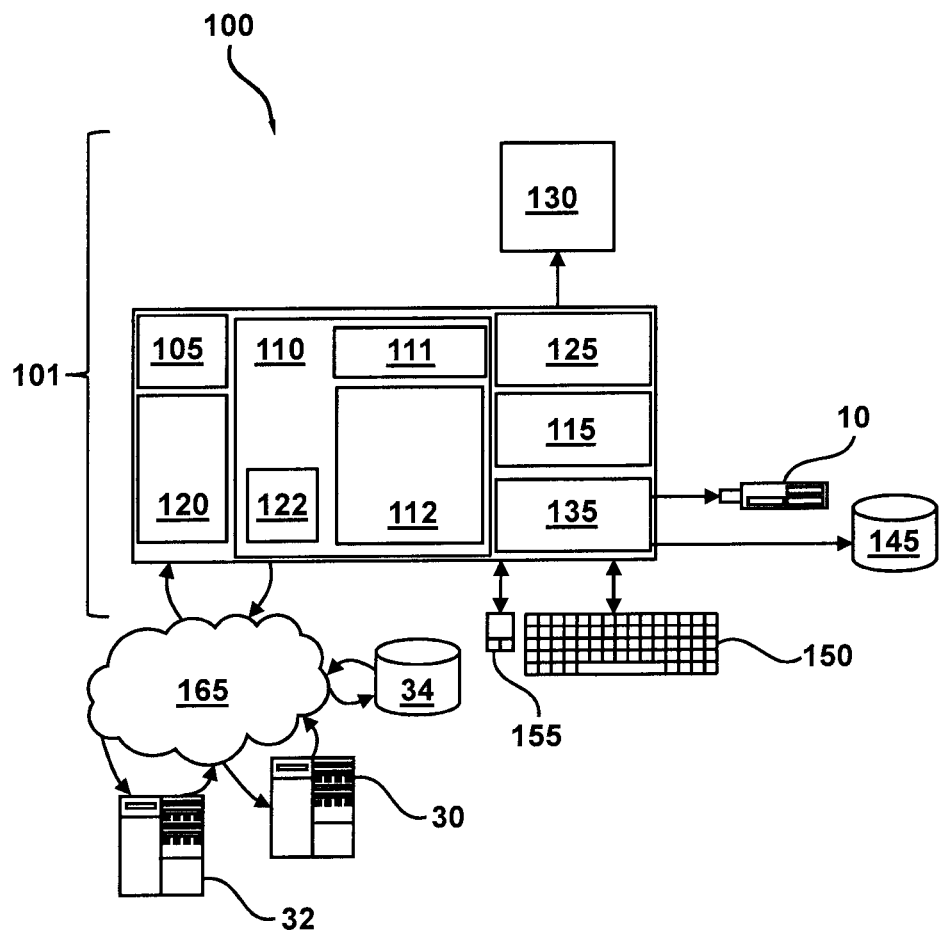
FIG. 1 depicts a schematic diagram of an example computer system suited for implementing at least one of the systems of the multiple system landscape.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of enabling a cloning of a source system to a target system taking into account the archive and archived data of the source system comprised by the respective archive. The archived data of the source system is available for the target system without a need for cloning of the archived data. Thus, performance tests in the target system may be valid to precisely predict performance in the source system, even in cases in which the performance test depends on archived data.

Embodiments may thus have the beneficial effect of reducing the amount of efforts necessary to generate and/or refresh, i.e. clone, the target system. For example, creating an additional second archive to be used with the target system would require the source system and the target system, as well as the archives for the source system and the target system, to be cloned in a federated manner. This may be avoided by embodiments. The aforementioned cloning of the archive may, in particular, cause problems, in case the source system as well as the target system are online, i.e. are in use simultaneously.

For example, updates and modifications may be tested in a quality assurance system provided in a form of the target system before they are applied to a production system provided in a form of the source system. These tests may only be valid if the quality assurance system and the production system are similar. Therefore, the quality assurance system may be periodically refreshed as a clone of the production system.

According to embodiments, the archive comprises multiple depots. Each of the depots is assigned with a creator ID identifying a system of the multiple system landscape which created the respective depot. Each system of the multiple system landscape comprises an internal control structure, e.g. an inventory table identifying all the data packages offloaded to the archive. Offloading refers to transferring the respective data package to the archive, i.e. copying the same to the archive and deleting it from the source system. The internal control structure may comprise a record for each data package offloaded from the respective system to one of the depots of the archive. The respective record comprises a package ID identifying the offloaded data package and a depot ID identifying the depot to which the respective data package is offloaded. Each system of the multiple system landscape may be provided with read-access to the archive. The read-access of the respective system is restricted to data packages for which the internal control structure comprises a record with the data package ID of the respective data package and the depot ID of the depot comprising the respective data package. Each system of the multiple system landscape may be provided with write-access to the archive. The write-access of the respective system is restricted to depots assigned with a creator ID identifying the accessing system as the creator of the respective depot.

According to embodiments, only the online production system for refreshing the quality assurance system is cloned, not the archive. After cloning, read-only access to portion of the archive used by and assigned to the production system is granted to the quality assurance system. Subsequent archiving processes in the production system may not destroy data correctness in the quality assurance system. Data packages subsequently archived by the production system may rather stay invisible for the quality assurance system and not affect the same until it is refreshed. In case of a refreshment, i.e. a re-cloning, of the production system, data packages archived by the production system until the time of re-cloning are taken into account. Furthermore, the archiving process itself may be tested in the quality assurance system before it is run on the production system. Therein, the quality assurance system has access to the same in the archive as the production system and uses the same archive to perform archiving tests.

The archive may logically consist of multiple depots. Each depot has a dedicated creator assigned. The creator may comprise an identifier identifying the system that has initiated the creation of the respective depot, like e.g., the system name. Each system may have an internal control structure, e.g. referred to as "inventory". For each package that has been offloaded to the archive, a record is written to the inventory containing a package identifier, e.g. package key, and a depot identifier, e.g. depot number, where the data resides after archiving.

A system, in particular a system resulting from cloning, may access only those data packages in the archive that have a corresponding record in the inventory of the respective system. Data packages in the archive that are not referenced in the inventory may not be read and rather are invisible for the respective system.

System cloning may in particular comprise copying the inventory. Thus, the cloned system has references to the archived data of the source system at the time of cloning. However, such references indicate to a depot, the creator of which is not the cloned system. Therefore, only read access is granted. Thus, the cloned system cannot amend a depot that has a foreign creator. This includes archiving of additional data packages within the respective depot. Consequently, the cloned system may use the same depot as the source system, whiteout interfering with the use of the archive by the source system. The source of the system clone may still archive into the depot which has been created by the respective source. But since the archive procedure does not add any entries to the inventory of the cloned system, new archived data packages do not become visible to the cloned system.

When data is archived off the cloned system, the archiving procedure may create an additional depot having the cloned system as creator, if a depot created by the cloned system does not already exist, and writes an additional archive package to the created additional depot. If a depot already exists, the additional archive package is written to the existing additional depot. The cloned system alone may have authority to update the additional depot. Thus, subsequent archiving packages of the cloned system may all be stored in the same depot created by the cloned system.

Cascading application of the above describe technique, i.e. generating system clones from cloned systems, may provide access to the archived data to all systems of the landscape. In other words, each system of the multiple system landscape, except the source system, may result from cloning. Update and delete operations on the data packages offloaded to the archive may create multiple depots that are only referenced by a single system of the multiple system landscape. However, depots may be implemented as logical structures within the archive. Depending on the implementation, data stored in the archive may actually be stored in a single archive table and the depots may be implemented as version numbers of the stored data. Thus, the archive may remain well organized on a physical level, even though it may comprise on a logical level multiple depots that are only referenced by a single system of the multiple system landscape.

According to embodiments, a physical replicate of the source system may be created initially, i.e. the cloning may refer to generating a physical replicate. In contrast, methods based on virtual copies, instead of physical ones, may only create a copy of the original system, but may neither be able to migrate data nor be able to link the original system to the migrated data. Therefore, embodiments may be suitable for actually archiving data in contrary to methods based on virtual copies.

Embodiments may provide the inventory table as a virtual part which makes archiving information available to an application logic. The application logic may decide upon this information from where data may be retrieved. It may not be possible to implement these features with methods based on virtual copies.

With methods based on virtual copies, updates on copied data that are performed in the original system may not visible to the clone target. According to embodiments, updates on data that have been archived before the system was cloned may be visible to the clone target.

According to embodiments, a system may be cloned, while the existence of an archive is ignored. Embodiments may have the beneficial effect that due to this, the cost of the cloning procedure may significantly be reduced. With methods based on virtual copies, online data and archived data may not be strictly separated. In contrast, embodiments based on a physical replication may enable such a strict separation.

According to embodiments, the method further comprises creating a second depot in the archive by the first target system. The second depot is assigned with a second creator ID identifying the first target system as the creator of the second depot. The first target system is provided with write-access to the archive which is restricted to depots assigned with the second creator ID. One or more data packages comprising data of the first target system are offloaded by the first target system to the second depot. For each of the data packages offloaded from the first target system to the second depot, a record is written by the first target system to the cloned internal control structure of the first target system. The respective record comprises a package ID identifying the respective data package and a second depot ID identifying the second depot.

Embodiments may have the beneficial effect that the target system may be enabled to store data packages in the same archive as the source system, and thus, to test archiving procedures on the respective archive. According to embodiments, the method further comprises using the first target system for testing additional features intended to be implemented into the source system.

According to embodiments, the method further comprises repeating the cloning of the source system to the first target system. When repeating the cloning, a current version of the first target system is replaced by a physical replicate of a current version of the source system. Embodiments may have the beneficial effect of enabling a refreshment of the target system, e.g. a periodic refreshment. Thus, it may be ensured that a target system used for testing additional features intended to be implemented into the source system may be kept up-to-date. A successfully tested additional feature may be implemented into the source system, in order to update the same. The updated system may be cloned again, i.e. used for refreshing the target system, in order to take the additional features into account for future tests.

According to embodiments, the method further comprises cloning the first target system to a second target system. The cloning of the first target system includes cloning of the internal control structure of the first target system. By cloning the first target system to the second target system, a physical replicate of the first target system in a form of the second target system is created. The second target system is provided with read-access to the archive. The read-access of the second target system is restricted to data packages for which the cloned internal control structure of the second target system comprises a record with a data package ID identifying the respective data package and a depot ID identifying the depot comprising the respective data package.

According to embodiments, the method further comprises creating a third depot in the archive by the second target system. The third depot is assigned with a third creator ID identifying the second target system as the creator of the third depot. The second target system is provided with write-access to the archive which is restricted to depots assigned with the third creator ID. One or more data packages comprising data of the second target system are offloaded from the second target system to the third depot. For each of the data packages offloaded from the second target system to the third depot, a record is written by the second target system to the cloned internal control structure of the second target system. The respective record comprises a package ID identifying the respective data package and a third depot ID identifying the third depot.

According to embodiments, the method further comprises using the second target system for developing additional features intended to be implemented into the first target system for testing.

Embodiments may have the beneficial effect that a development system may be provided for developing additional features using an up-to-date copy of a quality assurance system. The developed features may be implemented into the quality assurance system, for which they are optimized, and tested. In case, the tests are successful, the respective features may be implemented into a production system for actual use.

According to embodiments, the method further comprises creating the multiple system landscape by performing a cascade of cloning procedures. Each cloning procedure comprising cloning a preceding target system which has been generated in a preceding cloning procedure to a subsequent target system. The cloning of the preceding target system to the subsequent target system includes the internal control structure of the preceding target system. By cloning the preceding target system to the subsequent target system, a physical replicate of the preceding target system in a form of the subsequent target system is created.

According to embodiments, the method further comprises updating one or more of the data packages stored in the first depot by the source system. The updating comprises replacing each of the respective data packages in the first depot by an updated data package. The package ID of each of the updated data packages remains identical to the package ID of the data package being replaced by the respective updated data package.

Embodiments may have the beneficial effect that the data package offloaded by the source system may easily be updated and the target system may automatically be provided with reading access to the updated data package. Thus, the target system may automatically be kept up-to-date. Updates on archived data may only be performed by the system of the multiple system landscape that is the creator of the depot comprising the respective archived data. The creator system executes the update or delete operation without notifying any other system of multiple system landscape. In particular, it may not notify any systems having read-only access to the respective data. Thus, other systems of the multiple system landscape in case of a read access to the respective data read the updated data. This may not be considered a deficiency, but in fact rather be considered as beneficial and a wanted behavior.

According to embodiments, the method further comprises deleting the read access of the first target system to one or more of the data packages stored in the first depot. The deleting comprises deleting for each of the respective data packages the record in the cloned internal control structure of the first target system which comprises the package ID identifying the respective data package and the depot ID identifying the first depot.

Embodiments may have the beneficial effect of enabling to delete an offloaded data package for a cloned system, like the first target system, without actually deleting the respective data package from the archive. Thus, the effect of deleting one or more of the offloaded data packages may be tested without negative effects on the source system. In particular, the source system may be further enabled to use the archived data.

Consequently, a system having read-only access to the respective archived data may still delete the respective data, i.e. the entire archived data package. However, this delete operation in case of a read-only system may only remove the record identifying the data to be deleted as well as the depot comprising the respective data to be deleted from the read-only system's inventory. The underlying data stored in a depot of the archive is not deleted. In contrast, a delete operation executed by a system having write access may not only remove the record identifying the data to be deleted as well as the depot comprising the respective data to be delete from the write system's inventory, but also delete the underlying data stored in the archive. In case the target system tries to access a data package deleted by the source system, the data package will also be deleted for the target system.

According to embodiments, the archive further comprises a reference table. The reference table comprises for each data package of each depot of the archive a list of reference IDs. Each reference ID identifies a system of the multiple system landscape which comprises an internal control structure with a record comprising a package ID identifying the respective data package and a depot ID identifying the respective depot.

Embodiments may have the beneficial effect of enabling to update an archived data package, while maintaining the access of the target system to the original data packages before updating. The reference table may be introduced as part of the archive. For each archived data package in each depot, a list of systems referencing the respective archived data package is maintained in the reference table.

According to embodiments, deleting of the read access of the first target system to one of the data packages stored in the first depot further comprises deleting from the list of the reference table for the respective data package in the first depot the reference ID identifying the first target system. Embodiments may have the beneficial effect of keeping the reference table up-to-date and track different versions of the same data packages, e.g. assigned with the same name as a package ID, stored in different depots created by different systems. When an entire archived data package is deleted by one of the systems of the multiple system landscape, the corresponding record may be removed from the inventory of the respective system and a record in the reference table is updated accordingly.

According to embodiments, updating of one of the data packages stored in the first depot comprises checking, whether the list of the reference table for the respective data package comprises reference IDs of more than one system of the multiple system landscape. If reference IDs of more than one system are comprised, the updating comprises creating a fourth depot in the archive by the source system. The fourth depot is assigned with a fourth creator ID identifying the source system as the creator of the fourth depot. The data package to be updated is copied to the fourth depot. The record for the data package to be updated in the internal control structure of the source system is updated. The updating comprises replacing the first depot ID in the respective record by a fourth depot ID. Furthermore, the reference table is updated. The updating comprises removing the reference ID of the source system from the list for the data package to be updated in the first depot and adding a new list for the copied data package to be updated in the fourth depot. Finally, the copied data package is updated in the fourth depot. The updating comprises replacing the data packages to be updated in the fourth depot by the updated data package.

According to embodiments, if a single reference ID of a single system is comprised by the list of the reference table for the data package to be updated in the first depot, the updating comprises replacing the data packages to be updated in the first depot by the updated data package.

Embodiments may have the beneficial effect, in case different systems reference a data package, an update of the respective data package may be performed for a single one of the respective systems, while the respective data package stays the same for all the other systems. When archived data is supposed to be updated, it may be checked in the reference table whether there are more than one system referencing the data package to be updated. If this is not the case, the data package to be updated may just be updated. This may be enabled, even if the system initiating and executing the update is not the creator of the depot comprising the data to be updated. Otherwise an additional depot may be created and the affected archive packages, i.e. the data packages to be updated, may be copied to the new depot. The system's inventory record may be updated for all the affected archive packages such that the updated inventory record links to the additional depot. Afterwards, the update is executed on the archived data package in the additional depot.

According to embodiments, if the single system is not identified as the creator of the first depot by the first creator ID, the write-access of the single systems to the archive is extended. The extended write access enables the single system to update the data package to be updated in the first depot.

According to embodiments, the method further comprises searching the reference table for data packages and depots not referenced by any of the systems of the multiple system landscape, after each cloning of a system of the multiple system landscape. Data packages and depots not referenced are deleted in the reference table and in the archive.

It may occur that archived data packages and entire depots are not referenced anymore after a system refresh. Therefore, as part of the cloning procedure, the reference table may be cleaned up and obsolete archive packages and depots may be deleted.

According to embodiments, the method further comprises periodically searching the reference table for data packages and depots not referenced by any of the systems of the multiple system landscape. Data packages and depots not referenced are deleted in the reference table and in the archive.

It may occur that archived data packages and entire depots are not referenced anymore after a system refresh. The reference table may be cleaned up periodically and obsolete archive packages and depots may be deleted.

According to embodiments, the computer program product further comprises computer-readable program code configured to implement any of the embodiments of the method described herein.

According to embodiments, the computer system further is configured to execute any of the embodiments of the method described herein.

FIG. 1 depicts a computer system 100 suited for implementing a method for cloning a source system of a multiple system landscape to a target system. It will be appreciated that the methods described herein are at least partly non-interactive, and automated by way of computerized systems, such as servers or embedded systems. In example embodiments though, the methods described herein may be implemented in a (partly) interactive system. These methods may further be implemented in software 112, 122 (including firmware 122), hardware (processor) 105, or a combination thereof. In example embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101. For example, the source system may be provided by the computer system 100.

In example embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 may be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein, the I/O devices 10, 145 may generally include any generalized cryptographic card or smart card known in the art.

The processor 105 is a hardware device for executing software, particularly that stored in memory 110. The processor 105 may be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 may include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 may have a distributed architecture, where various components are situated remote from one another, but may be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112, e.g. configured to implement a method for cloning the configuration of computers 100 or at least portions of the respective configuration.

The software in memory 110 shall also typically include a suitable operating system (OS) 111. As an example, the OS 111 controls the execution of other computer programs, such as possibly software 112 for implementing methods as described herein.

The methods described herein may be in the form of a source program 112, executable program 112 (object code), script, or any other entity comprising a set of instructions 112 to be performed. The software 112 may, e.g. implement cloning. When being provided as a source program, the respective program is to be translated via a compiler, assembler, interpreter, or the like, which may or may not be included within the memory 110, so as to operate properly in connection with the OS 111. Furthermore, the methods may be written as an object-oriented programming language, which has classes of data and methods, or a procedure programming language, which has routines, subroutines, and/or functions.

In example embodiments, a conventional keyboard 150 and mouse 155 may be coupled to the input/output controller 135. Other devices, such as the I/O devices 145, may include input devices, for example, but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 may be any generalized cryptographic card or smart card known in the art. The system 100 may further include a display controller 125 coupled to a display 130. In example embodiments, the system 100 may further include a network interface for coupling to a network 165. The network 165 may be an IP-based network for communication between the computer 101 and any external server, client and the like via a broadband connection. The network 165 transmits and receives data between the computer 101 and external systems 30, 32, which may be involved to perform part or all of the steps of the methods discussed herein. In example embodiments, network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of software routines that initialize and test hardware at startup, start the OS 111, and support the transfer of data among the hardware devices. The BIOS is stored in ROM so that the BIOS may be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods may be stored on any computer readable medium, such as storage 120, for use by or in connection with any computer related system or method. The storage 120 may comprise a disk storage, such as HDD storage.

A multiple system landscape may comprise further systems 30, 32, e.g. a first and second target system, which may be accessed by the source system 100 via the network 165. Source system 100 may, e.g. be a production system, while first target system 30 may provide a quality assurance system and second target system 32 may provide a development system. The target systems 30, 32 may comprise similar or identical hardware and/or software as the source system 100. The configuration or at least portions of the configuration of the source system 100 may be cloned to the first target system 30. The configuration or at least portions of the configuration of the first target system 30 may be cloned to the second target system 32. The systems 100, 30 and 32 may have access to a common external archive 34 via the network 165, which may e.g. be provided by a database. The systems 100, 30 and 32 may each be provided with read-access to common data offloaded to the archive 34, as well as individual data offloaded to the archive 34. Furthermore, each of the systems 100, 30 and 32 may be provided with a restricted write-access to the respective archive 34.

Figure 2:
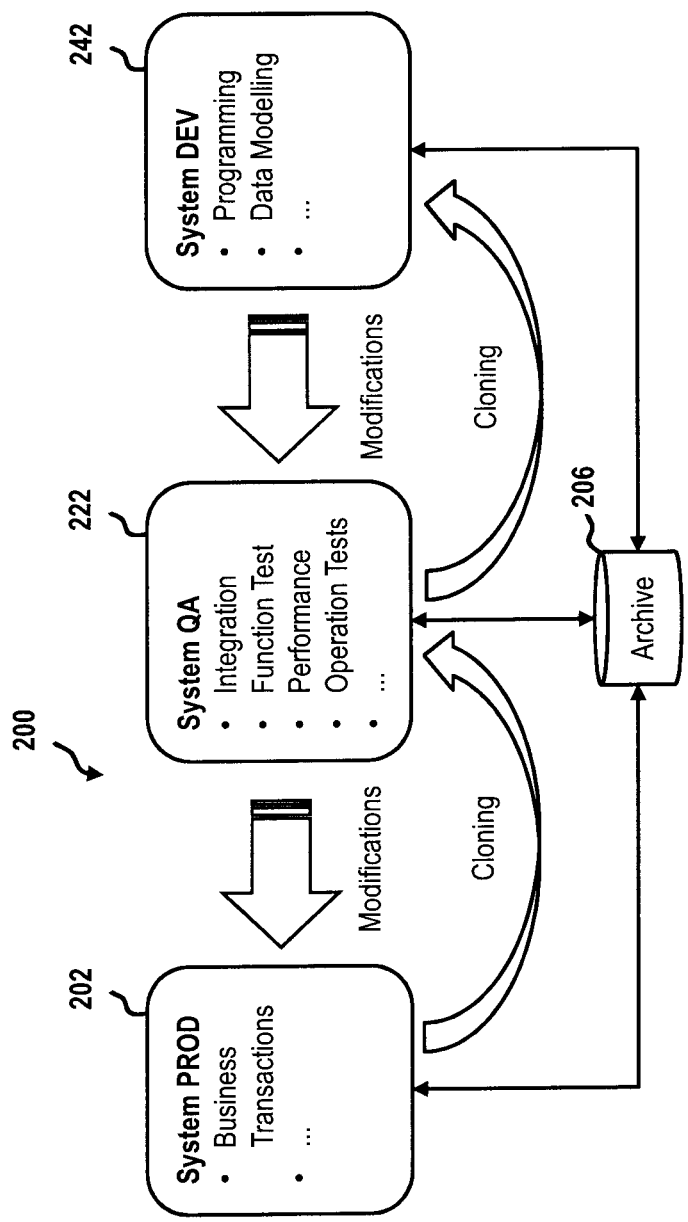
FIG. 2 depicts a schematic diagram of an example multiple system landscape.

FIG. 2 depicts an example multiple system landscape 200 comprising a production (PROD) system 202, a quality assurance (QA) system 222 and a development (DEV) system 242. Systems 202, 222, 242 have access to a common archive 206. The PROD system 202 may e.g. be configured for execution business transaction. It may be cloned to provide or refresh the QA system 222. The QA system 222 may e.g. be configured for integrating additional features, test the function of such additional features, analyze their performance and/or test operations. QA system 222 may be cloned to provide or refresh the DEV system 242. The DEV system 242 may e.g. be configured for programming and/or data modelling. According to embodiments, the DEV system 242 may be used to develop new features or applications for the PROD system 202. The new features and applications may be implemented into QA system 222, i.e. the same may be modified accordingly. The modified QA system 222 may be used to test the performance of the newly developed features or applications for quality assurance. In case the tests are successful, the new features and applications may be implemented into PROD system 202, i.e. the same may be modified accordingly. The modified PROD system 202 may then be used in real life.

Figure 3A:
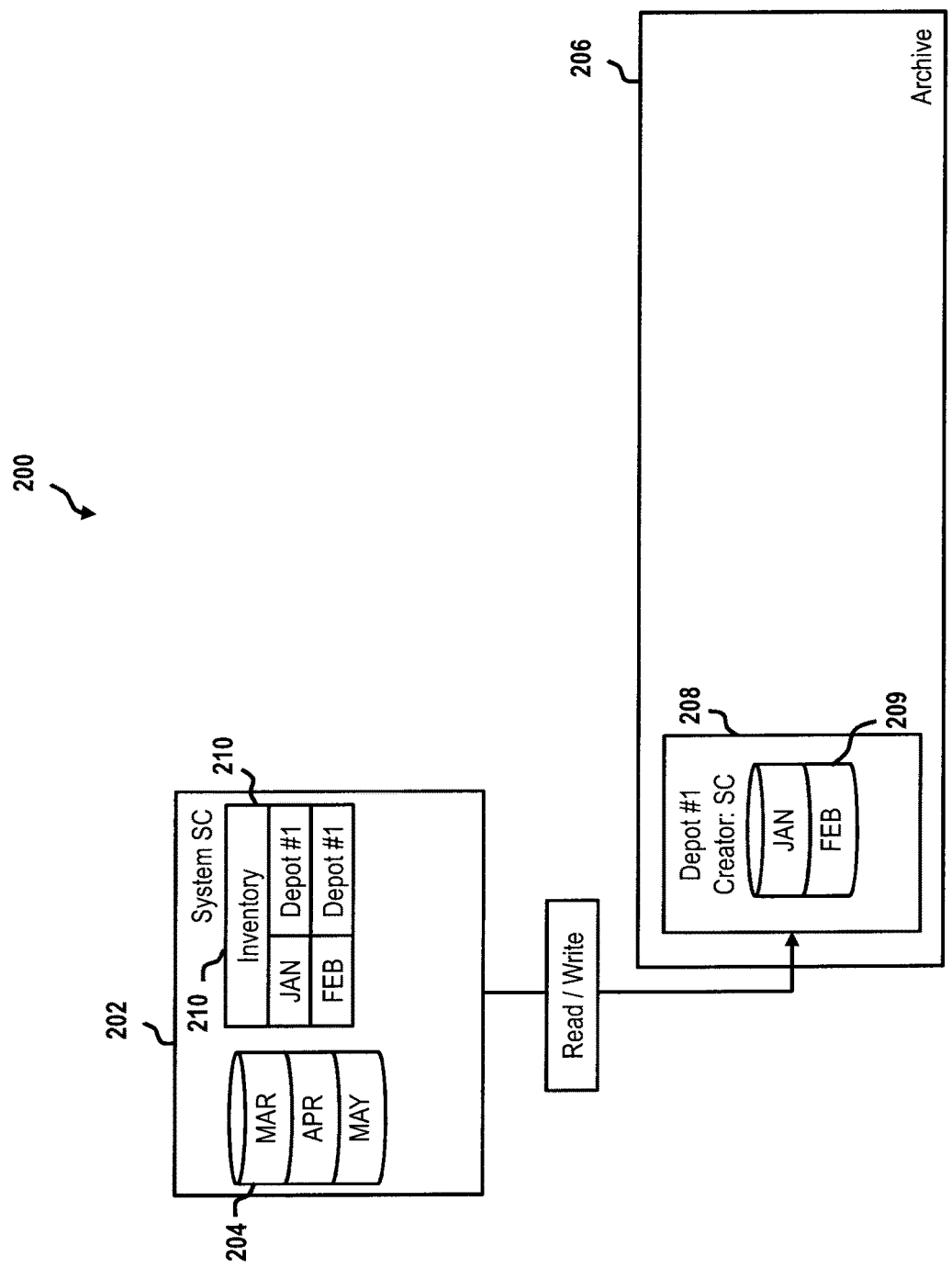
FIGS. 3A-3F depict schematic diagrams of different configurations of a multiple system landscape when executing cloning.

FIGS. 3A-3F depict example configurations of a multiple system landscape when executing cloning procedures generating a multiple system landscape. FIG. 3A shows an initial configuration comprising only a source (SC) system 202 of the multiple system landscape 200. The source system 202 comprises, e.g. three data packages 204 with keys, i.e. package IDs, MAR, APR and MAY stored in an online database of source system 202. The online database is a database comprised by source system 202. In addition, two data packages 209 with keys JAN and FEB have been migrated off the online database to an external storage 206 referred to as an archive. Within the archive, data packages 209, JAN and FEB, reside in a logical container 208 referred to as a depot assigned with a depot ID "Depot #1". The container 208 is assigned with a creator ID in the form of an attribute creator with value "SC", which is the source system's name of the data that container 208 holds. Furthermore, source system 202 comprises an internal control structure in the form of an inventory table 210 mapping the data migrated off from source system 202 to the container 208 that contains the respective data within the archive 206.

Source system 202 may read data from container "Depot #1" 208. Source system 202 may further archive one or more additional data packages to container "Depot #1" 208, since the value of the creator attribute "SC" of the container 208 identifies source system 202 as the creator of depot 208.

Figure 3B:
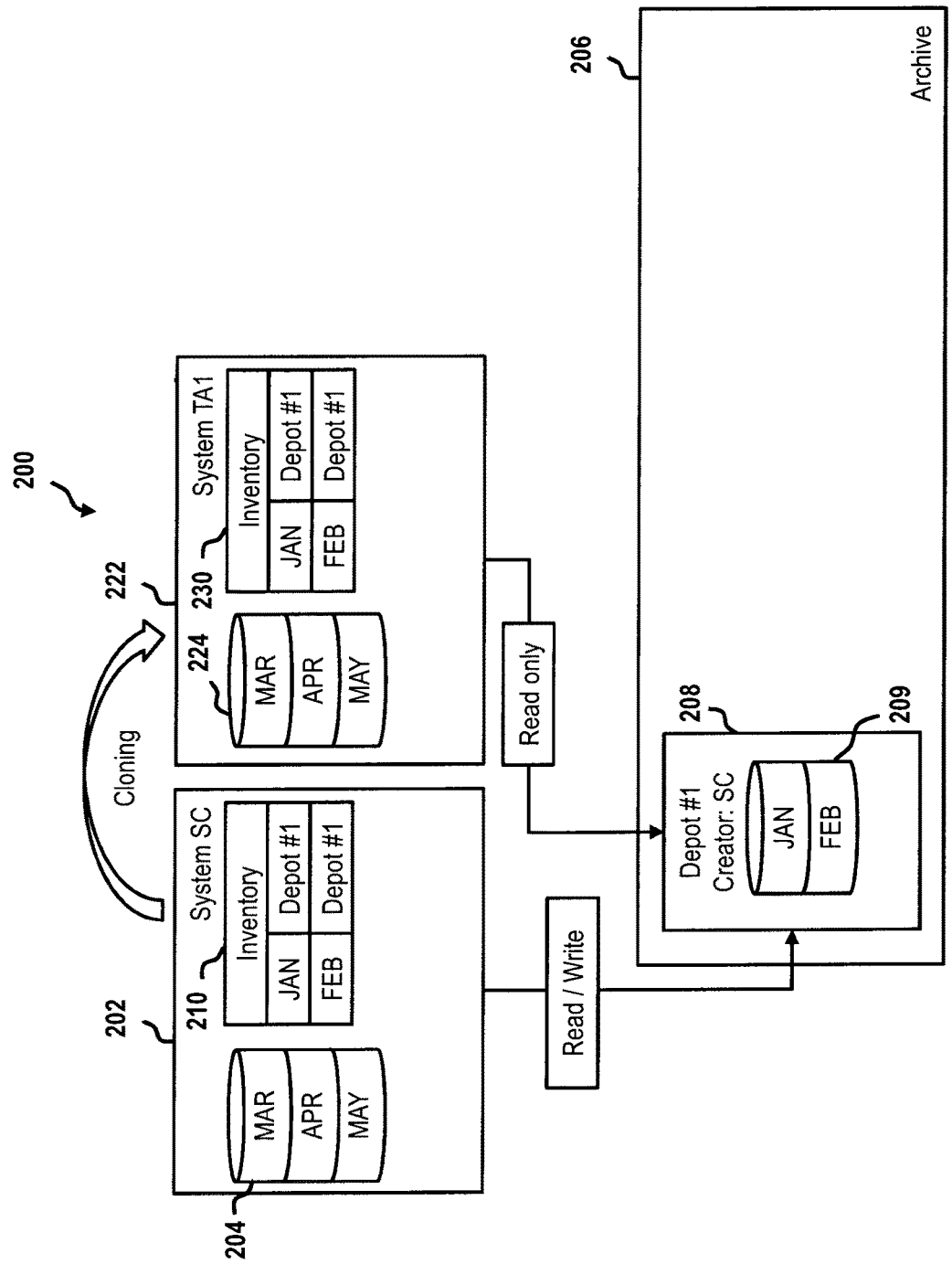

In FIG. 3B, source system 202 is cloned. The clone target system is a first target (TA1) system 222. During the clone procedure, online data comprised by source system 202 is copied to target system TA1 222. This includes data packages MAR, APR and MAY 204 of a database of the source system to data packages MAR, APR and MAY 224 of a database of the first target system. Furthermore, inventory table 210 is cloned to the inventory table 230. Therefore, after cloning it is known to system TA1 222 that data packages JAN and FEB 209 exist in container "Depot #1" 208 within the archive system 206. Thus, system TA1 222 is enabled to read the respective data provided by data packages JAN and FEB 209. However, system 222 is not allowed to transfer, i.e. archive, data into container 208, since the attribute creator of container 208, i.e. "SC", differs from the name of the first target system 222, i.e. "TA1".

Figure 3C:
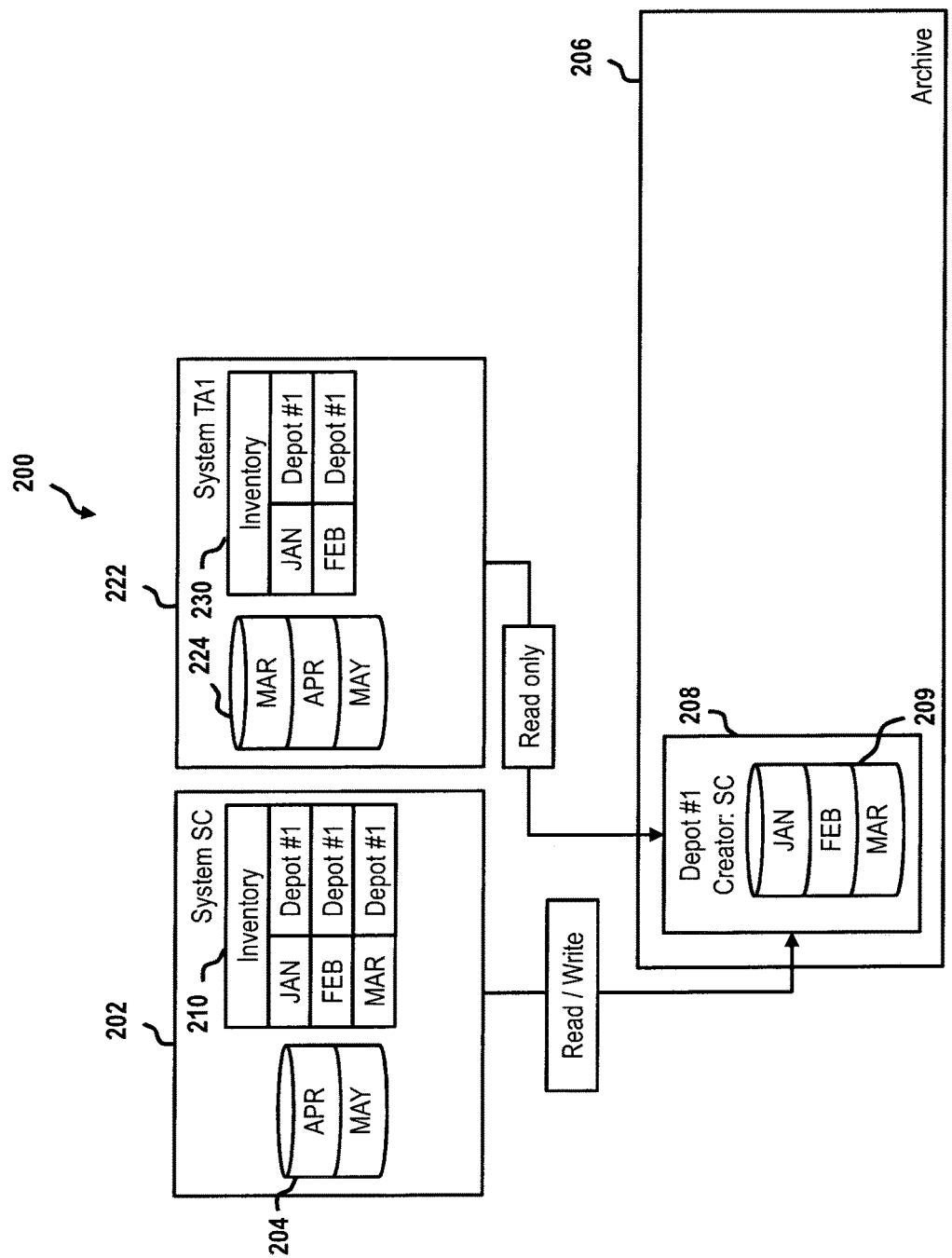

FIG. 3C illustrates the situation after data package MAR has been migrated off the source system 202 to the archive 206. As part of the archiving procedure, an additional entry has been added to the inventory table 210 in the source system 202 mapping the data package key "MAR" to container 208, i.e. "Depot #1", within the archive 206. Due to the presence of this additional entry, the source system 202 is enabled to access data package MAR in the archive 206. In contrast, the first target system 222 does not comprise a pointer to data package MAR, and therefore, is not enabled to read the respective data from the archive 206. Instead, system TA1 222 may rather read the respective data as data package MAR from the online database comprised by system TA1 222.

Figure 3D:
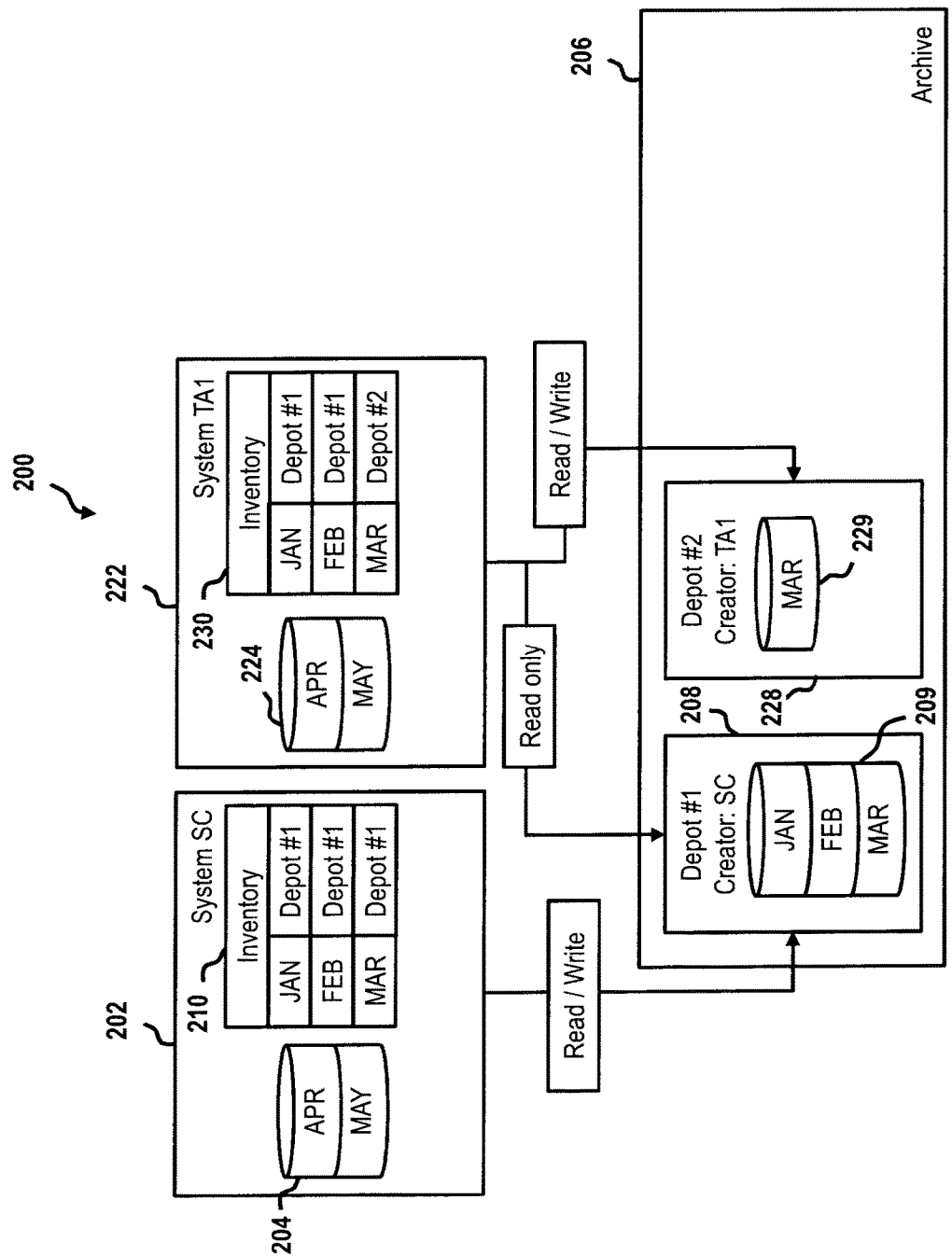

In FIG. 3D, data package MAR has been migrated off system TA1 222 to the archive 206. Since system TA1 222 is not allowed to write data to existing container 208, which is exclusively assigned to the source system 202, an additional container "Depot #2" 228 is created by the first target system 222 within the archive 206 and data package MAR 229 is being written to the respective additional container 228. The attribute creator of container 228 is set to value "TA1", because this is the name, i.e. ID, of the system that has created the respective container 228. Since the value of the attribute creator of container 228 matches the system name of system TA1 222 and because an entry for data package MAR is comprised by inventory table 230 of system 222 in combination with the depot ID "Depot #2", system TA1 222 is enabled to read data package MAR from container "Depot #2" 228 and to archive additional data packages into container 228 within the archive system 206. In contrast, depot 228 is invisible for the source system 202.

Figure 3E:
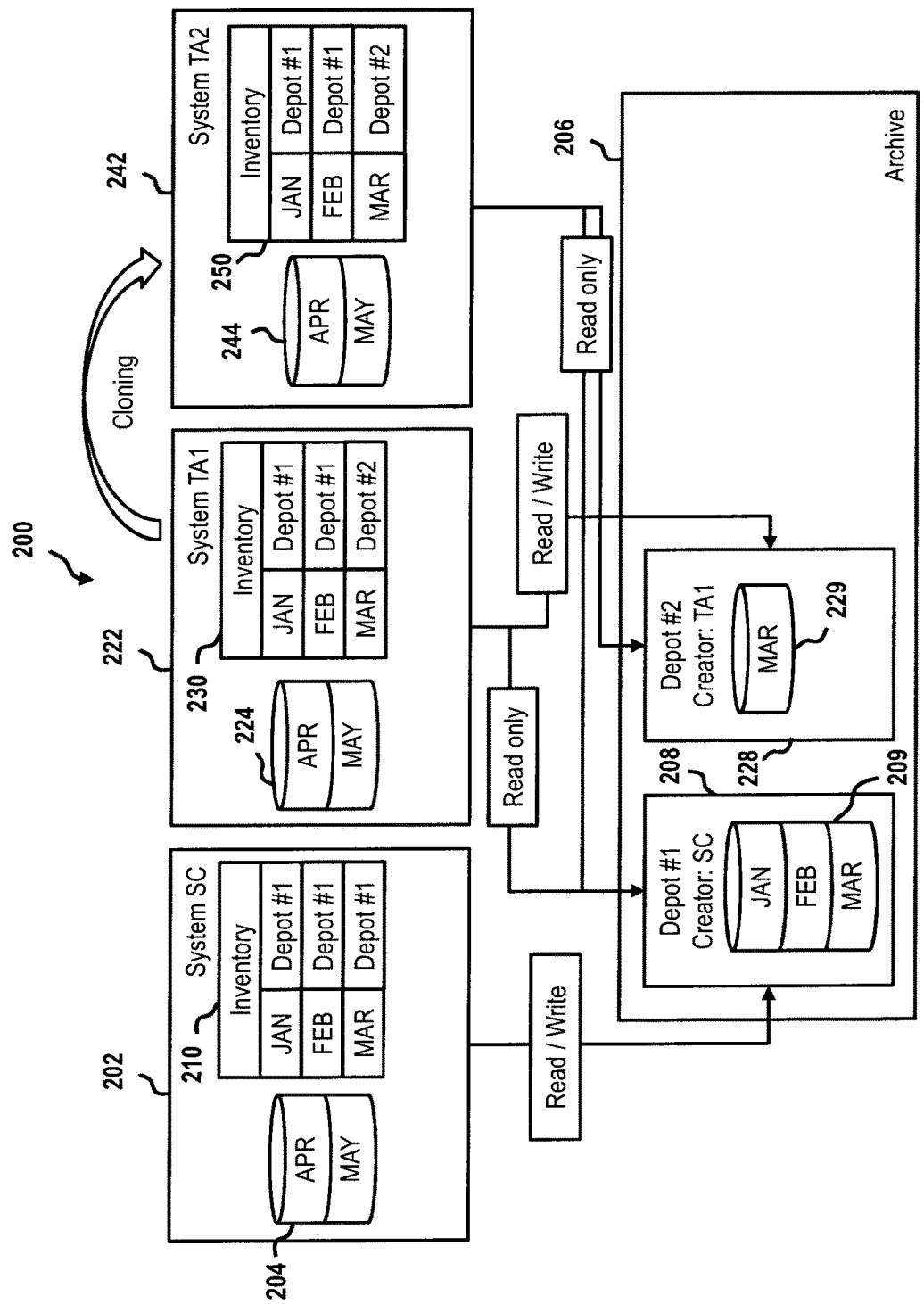

FIG. 3E shows a cascading application of the cloning procedure described above. System TA1 222 is cloned to a second target system, i.e. system TA2 242. Since after cloning of system TA1 222, the inventory tables 230, 250 of system TA1 222 and system TA2 242 are identical copies, system TA2 242 is enabled to read all data package from archive 206 that system TA1 222 was enabled to read at the time it has been cloned. However, system TA2 242 is not allowed to write data to any existing container 208, 228 within the archive 206, because none of the attributes creator of the existing containers 208, 228 is set to the name of system TA2 242, i.e. "TA2".

Figure 3F:
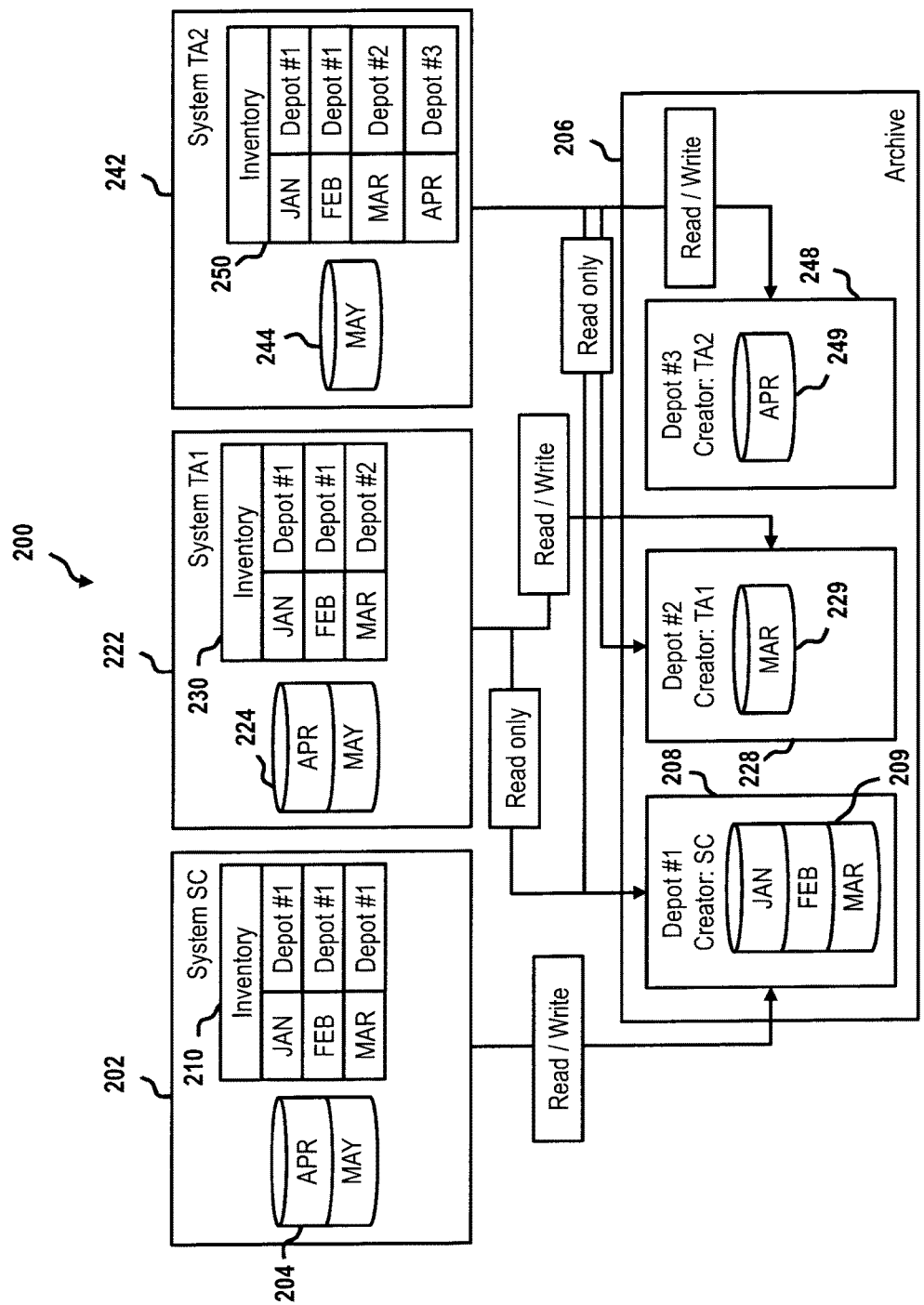

Finally, as shown in FIG. 3F, an additional container 248 with name "Depot #3" may be created, when system TA2

242 migrates cloned data package APR 244 (FIG. 3E) to the archive 206. Attribute creator of container 248 created by system TA2 242 is set to "TA2". Consequently, system TA2 242 is enabled to read cloned data package APR 249 from container 248 identified by inventory table 250 of system TA2 242 and furthermore allowed to migrate data to the additional container 248 created by system TA2 242. For the source system 202, as well as the first target system, container 248 is invisible.

Figure 4:
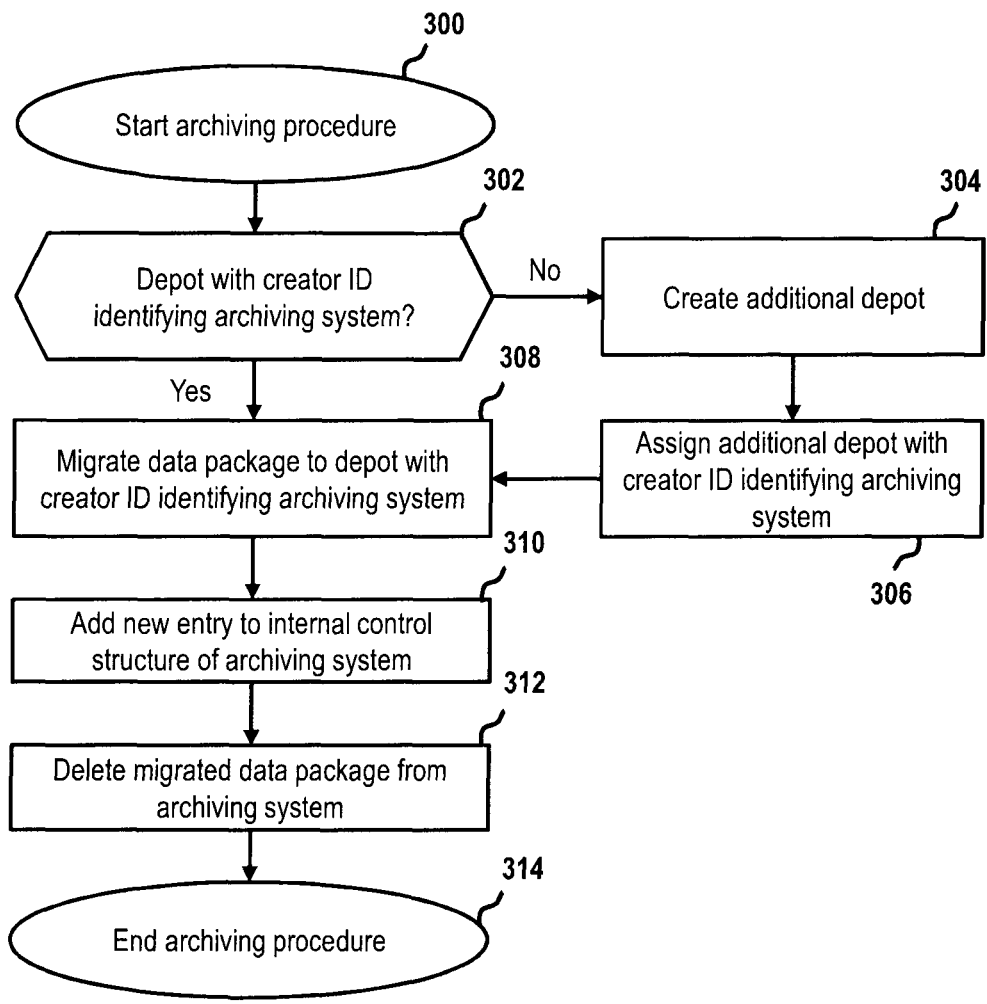
FIG. 4 depicts a schematic flow diagram of an example archiving technique.

FIG. 4 depicts one example of a schematic flow diagram of an example archiving technique. In step 300, the archiving procedure is started. In step 302, it is determined whether there exists a depot in the archive with a creator ID identifying the archiving system as the creator of the respective system. In case such a depot already exists, the procedure continues with step 308. Otherwise, the procedure continues with step 304. In step 304, an additional depot is created in the archive by the archiving system. In step 306, the additional depot is assigned with a creator ID identifying the archiving system as the creator of the respective depot. In step 308, the data package to be archived, i.e. offloaded from the archiving system, is migrated to the depot with the creator ID identifying the archiving system as the creator of the respective depot. In step 310, a new entry is added to the internal control structure, i.e. inventory table, of the archiving system. The new entry comprises a package ID identifying the data package migrated, as well as a depot ID identifying the depot to which the respective data packages has been migrated. In step 312, the migrated data package is deleted from the archiving system, and the procedure ends with step 314.

Figure 5A:
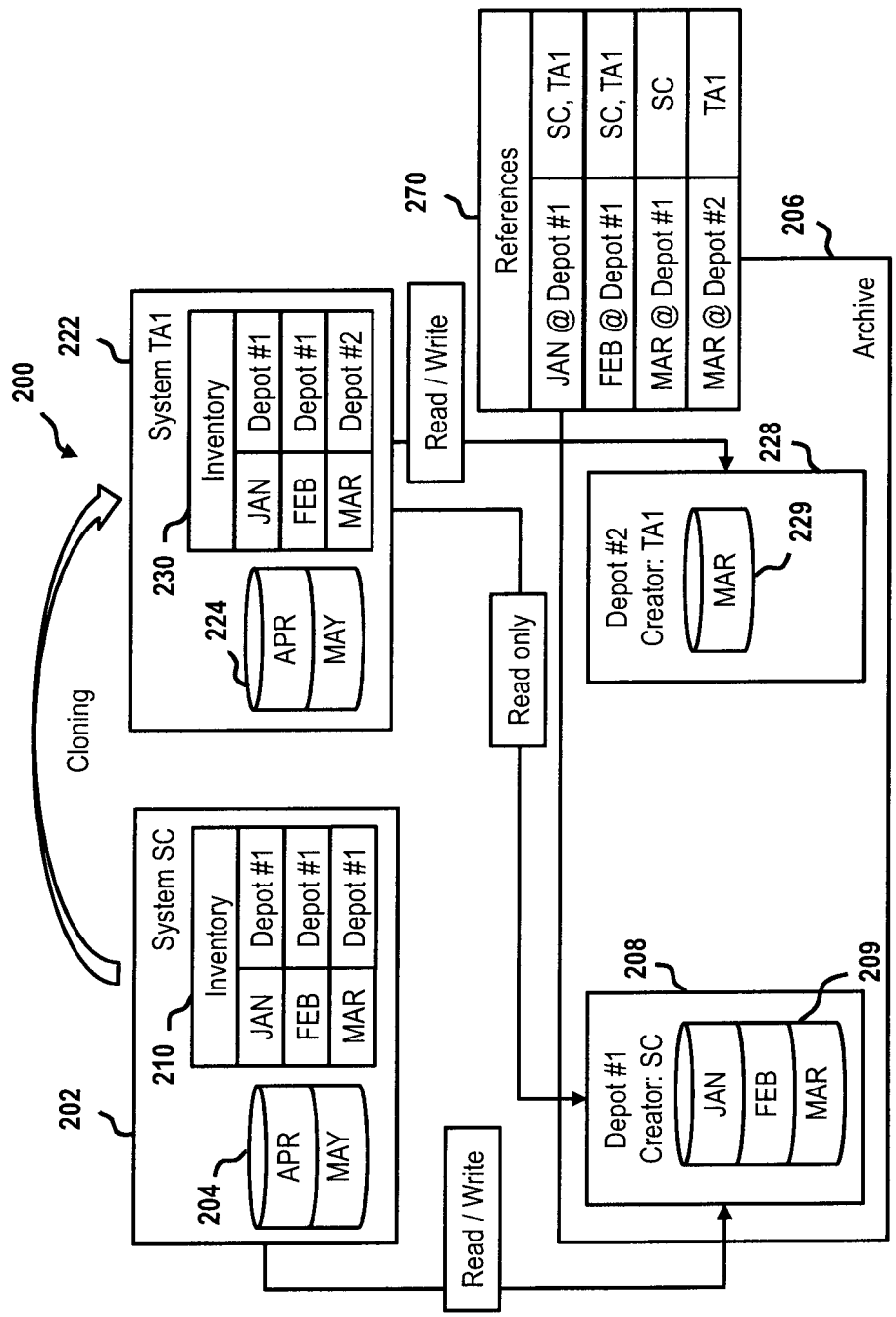
FIGS. 5A-5B depict schematic diagrams of different configurations of a multiple system landscape when executing cloning.
Figure 5B:
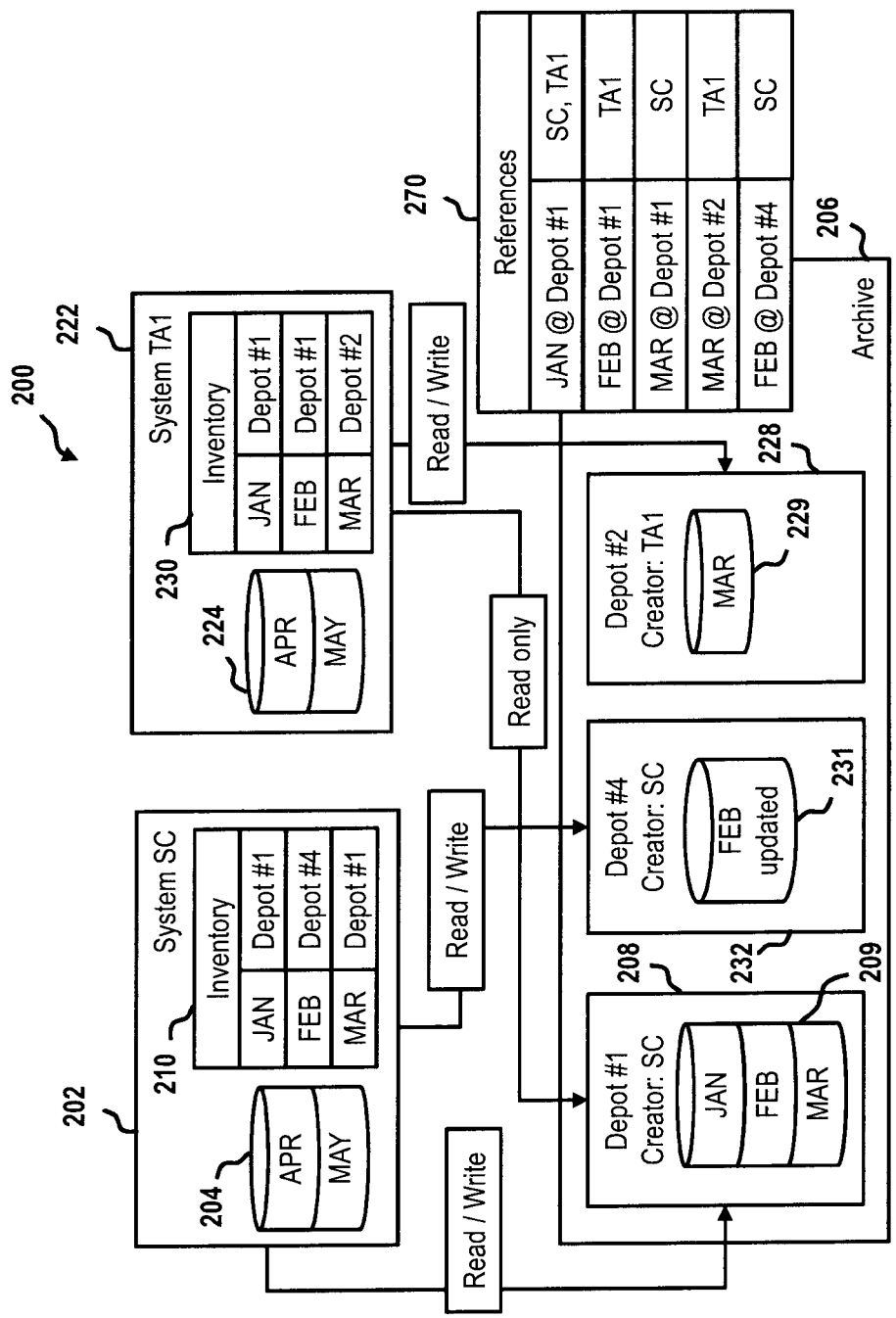

FIGS. 5A-5B depict example configurations of a multiple system landscape 200 when executing cloning. In FIG. 5A, a multiple system landscape 200 comprising a source system 202 and a first target system 222 is shown. The configuration of FIG. 5A corresponds to the configuration of FIG. 3D. In case of FIG. 5A, the external archive 206 in addition comprises a reference table 270. The reference table 270 comprises an entry for each data package 209, 229 of each depot 208, 228 of the archive. The entries of reference table 270 each comprises a package ID of the respective data package, as well as a depot ID of the depot in which the respective data package is stored. Furthermore, each entry comprises a list of IDs of the systems referencing the respective data package in the respective depot. For example, the data package "JAN" in depot 208 "Depot #1" is reference by the inventory table 210 of the source system SC 202 as well as by the inventory table 230 of the first target system TA1 222. On the other hand, the data package "MAR" in depot 208, as well as the data package "MAR" in depot 228, is each referenced by only a single system, i.e. the source system SC 202 and the first target system TA1 222, respectively.

FIG. 5B shows the configuration after updating the data package "FEB" by the source system SC 202. Since the data package "FEB" in depot 208 according to the reference table 270 is referenced by more than one system, i.e. by the source system SC 202 and by the first target system TA1 222, the data package "FEB" is not updated within the depot 208. The data package "FEB" is rather maintained unaltered in depot 208, such that the first target system TA1 222 points to the unaltered data. Source system SC 202 rather generates a new depot 232 with depot ID "Depot #4" in archive 206. The new depot 232 is assigned with the attribute creator having the value "SC", i.e. identifying the source system SC 202 as the creator of the respective depot 232. Thus, two depots 208, 232 are assigned to the source system SC 202.

The source system SC 202 copies the data package "FEB" to be updated from depot 208 to depot 232 and updates the same. Thus, depot 232 comprises the updated data package "FEB" 231. The inventory table 210 of the source system SC 202 is amended accordingly such that it points to the updated data package "FEB" 231 of depot 232 rather than the unaltered data package "FEB" of depot 208. The modification of the references of the inventory table 210 of the source system SC 202 is also added to reference table 210 in form of an additional entry.

As described herein, one aspect of the invention relates to a computer-implemented method for cloning a source system of a multiple system landscape to a first target system of the multiple system landscape. An archive is provided for offloading data packages comprising data of the systems of the multiple system landscape. The method comprises creating a first depot in the archive by the source system. The first depot is assigned with a first creator ID identifying the source system as the creator of the first depot. The source system is provided with write-access to the archive. The write-access of the source system is restricted to depots assigned with the first creator ID. One or more data packages comprising data of the source system are offloaded by the source system to the first depot. For each of the data packages offloaded from the source system to the first depot, a record is written by the source system to an internal control structure of the source system. The respective record comprises a package ID identifying the respective data package and a first depot ID identifying the first depot. The source system is further provided with read-access to the archive. The read-access of the source system is restricted to data packages for which the internal control structure of the source system comprises a record with a package ID identifying the respective data package and a depot ID identifying the depot comprising the respective data package.

The source system is cloned to the first target system. The cloning of the source system includes cloning of the internal control structure of the source system. By cloning the source system to the first target system, a physical replicate of the source system in a form of the first target system is created. The resulting first target system is provided with read-access to the archive. The read-access of the first target system is restricted to data packages for which the cloned internal control structure of the first target system comprises a record with a data package ID identifying the respective data package and a depot ID identifying the depot comprising the respective data package.

A further aspect of the invention relates to a computer program product comprising a non-volatile computer-readable storage medium having computer-readable program code embodied therewith. The computer-readable program code is configured to implement a method, when it is executed by a computer system A further aspect of the invention relates to a computer program product comprising a non-volatile computer-readable storage medium. The storage medium has computer-readable program code embodied therewith. The computer-readable program code is configured to implement a method for cloning a source system of a multiple system landscape to a first target system of the multiple system landscape, when being executed by a computer system. An archive is provided for offloading data packages comprising data of the systems of the multiple system landscape. The method implemented by the computer-readable program code comprises creating a first depot in the archive by the source system. The first depot is assigned with a first creator ID identifying the source system as the creator of the first depot.

The source system is provided with write-access to the archive. The write-access of the source system is restricted to depots assigned with the first creator ID. One or more data packages comprising data of the source system are offloaded by the source system to the first depot. For each of the data packages offloaded from the source system to the first depot, a record is written by the source system to an internal control structure of the source system. The respective record comprises a package ID identifying the respective data package and a first depot ID identifying the first depot. The source system is further provided with read-access to the archive. The read-access of the source system is restricted to data packages for which the internal control structure of the source system comprises a record with a package ID identifying the respective data package and a depot ID identifying the depot comprising the respective data package.

The source system is cloned to the first target system. The cloning of the source system includes cloning of the internal control structure of the source system. By cloning the source system to the first target system, a physical replicate of the source system in a form of the first target system is created. The resulting first target system is provided with read-access to the archive. The read-access of the first target system is restricted to data packages for which the cloned internal control structure of the first target system comprises a record with a data package ID identifying the respective data package and a depot ID identifying the depot comprising the respective data package.

A yet further aspect of the invention relates to a computer system implementing at least a source system of a multiple system landscape. The computer system is configured for accessing an archive for offloading data packages comprising data of the systems of the multiple system landscape. The computer system is configured for creating a first depot in the archive by the source system. The first depot is assigned with a first creator ID identifying the source system as the creator of the first depot. The source system is provided with write-access to the archive. The write-access of the source system is restricted to depots assigned with the first creator ID. One or more data packages comprising data of the source system are offloaded by the source system to the first depot. For each of the data packages offloaded from the source system to the first depot, a record is written by the source system to an internal control structure of the source system. The respective record comprises a package ID identifying the respective data package and a first depot ID identifying the first depot. The source system is further provided with read-access to the archive. The read-access of the source system is restricted to data packages for which the internal control structure of the source system comprises a record with a package ID identifying the respective data package and a depot ID identifying the depot comprising the respective data package.

The source system is cloned to the first target system. The cloning of the source system includes cloning of the internal control structure of the source system. By cloning the source system to the first target system, a physical replicate of the source system in a form of the first target system is created. The resulting first target system is provided with read-access to the archive. The read-access of the first target system is restricted to data packages for which the cloned internal control structure of the first target system comprises a record with a data package ID identifying the respective data package and a depot ID identifying the depot comprising the respective data package.

It is understood that one or more of the aforementioned embodiments of the invention may be combined as long as the combined embodiments are not mutually exclusive. Ordinal numbers, like e.g. 'first' and 'second', are used herein to indicate different elements assigned with the same name, but do not necessarily establish any order of the respective elements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of cloning a source system of a multiple system landscape to a first target system of the multiple system landscape, the computer-implemented method comprising:
  creating, by the source system, a first depot in an archive comprising a plurality of depots, wherein:
    the archive being accessible by a plurality of systems of the multiple system landscape including the source system and the first target system,
    the first depot being assigned a first creator ID identifying the source system as a creator of the first depot, and
    the source system being provided with write-access restricted to any depot assigned with the first creator ID in the archive,
  offloading, by the source system, one or more data packages of the source system to the first depot;
  for each of the one or more data packages offloaded from the source system to the first depot, writing, by the source system, a record to an internal control structure of the source system, wherein:
    the record comprising a package ID identifying the data package and a first depot ID identifying the first depot, and
    the source system being provided with read-access restricted to any data package in the archive for which the internal control structure of the source system comprises a respective record with a respective package ID identifying a respective data package and a depot ID identifying the depot comprising the respective data package, where the depot ID is assigned a creator ID identifying the source system as creator of the depot,
  cloning the source system, including the internal control structure of the source system, to the first target system, wherein:
    the cloning comprises creating a physical replicate of the source system in a form of the first target system, and the first target system being provided with read-access restricted to any data package in the archive for which a cloned an internal control structure of the first target system, being a cloned internal control structure of the source system, comprises the respective record with the respective package ID and the depot ID identifying the depot comprising the respective data package, where the depot ID is assigned a creator ID identifying the source system as creator of the depot, or the first target system as creator of the depot.

2. The computer-implemented method of claim 1, further comprising:
creating a second depot in the archive by the first target system, the second depot being assigned a second creator ID identifying the first target system as a creator of the second depot, the first target system being provided with write-access restricted to any depot in the archive assigned with the second creator ID;
offloading one or more data packages of the first target system to the second depot; and
for each of the one or more data packages offloaded from the first target system to the second depot, writing a record to the internal control structure of the first target system, the record of the internal control structure of the first target system comprising a package ID identifying the data package offloaded from the first target system and a second depot ID identifying the second depot.

3. The computer-implemented method of claim 1, further comprising using the first target system for testing additional features intended to be implemented in the source system.

4. The computer-implemented method of claim 1, further comprising repeating the cloning of the source system to the first target system, wherein a current version of the first target system is replaced by a physical replicate of a current version of the source system.

5. The computer-implemented method of claim 1, further comprising:
cloning the first target system, including the internal control structure of the first target system, to a second target system, wherein:
the cloning comprises creating a physical replicate of the first target system in a form of the second target system, and
the second target system being provided with read-access restricted to any data package for which an internal control structure of the second target system, being a cloned internal control structure of the first target system, comprises the respective record with the respective data package ID and a depot ID identifying the depot comprising the data package, where the depot ID is assigned a creator ID identifying the source system as creator of the depot, the first target system as creator of the depot, or the second target system as creator of the depot.

6. The computer-implemented method of claim 5, further comprising:
creating a third depot in the archive by the second target system, the third depot being assigned a third creator ID identifying the second target system as a creator of the third depot, the second target system being provided with write-access restricted to any depot in the archive assigned with the third creator ID;
offloading one or more data packages of the second target system to the third depot; and for each of the one or more data packages offloaded from the second target system to the third depot, writing a record to the internal control structure of the second target system, the record of the internal control structure of the second target system comprising a package ID identifying the data package offloaded from the second target system and a third depot ID identifying the third depot.

7. The computer-implemented method of claim 5, further comprising using the second target system for developing additional features intended to be implemented in the first target system for testing.

8. The computer-implemented method of claim 5, further comprising creating the multiple system landscape by performing a cascade of cloning procedures, each cloning procedure comprising cloning a preceding target system, including an internal control structure of the preceding target system, which has been generated in a preceding cloning procedure to a subsequent target system, wherein the cloning comprises creating a physical replicate of the preceding target system in a form of the subsequent target system.

9. The computer-implemented method of claim 1, further comprising updating one or more of a plurality of data packages stored in the first depot by the source system, the updating comprising replacing at least one data package in the first depot by at least one updated data package, wherein a corresponding package ID of each data package of the at least one updated data package remains unchanged after the updating.

10. The computer-implemented method of claim 1, wherein the archive further comprises a reference table comprising, for each data package of each depot of the archive, a list of reference IDs identifying systems of the multiple system landscape comprising internal control structures with a record comprising the package ID and the depot ID.

11. The computer-implemented method of claim 10, further comprising updating one selected data package of a plurality of data packages stored in the first depot, the updating comprising checking whether the list of the reference IDs comprises reference IDs of more than one system of the multiple system landscape for the selected data package, and wherein based on there being reference IDs of more than one system, the updating comprises:
creating a fourth depot in the archive by the source system, the fourth depot being assigned a fourth creator ID identifying the source system as a creator of the fourth depot;
copying the selected data package to be updated to the fourth depot;
updating a respective record for the selected data package in the internal control structure of the source system, wherein the updating comprises replacing the first depot ID in the respective record by a fourth depot ID;
updating the reference table, wherein the updating comprises removing the reference ID of the source system from the list for the selected data package in the first depot and adding a new list for the selected data package in the fourth depot; and
updating the selected data package in the fourth depot.

12. A computer system for cloning a source system of a multiple system landscape to a first target system of the multiple system landscape, the computer system comprising:
a memory; and a processor in communication with the memory, wherein the computer system is configured to perform a method, said method comprising:
creating, by the source system, a first depot in an archive comprising a plurality of depots, wherein:
the archive being accessible by a plurality of systems of the multiple system landscape including the source system and the first target system,
the first depot being assigned a first creator ID identifying the source system as a creator of the first depot, and
the source system being provided with write-access restricted to any depot assigned with the first creator ID in the archive,
offloading, by the source system, one or more data of the source system to the first depot;
for each of the one or more data packages offloaded from the source system to the first depot, writing, by the source system, a record to an internal control structure of the source system, wherein:
the record comprising a package ID identifying the data package and a first depot ID identifying the first depot, and
the source system being provided with read-access restricted to any data package in the archive for which the internal control structure of the source system comprises a respective record with a respective package ID identifying a respective data package and a depot ID identifying the depot comprising the respective data package, where the depot ID is assigned a creator ID identifying the source system as creator of the depot,
cloning the source system, including the internal control structure of the source system, to the first target system, wherein:
the cloning comprises creating a physical replicate of the source system in a form of the first target system, and
the first target system being provided with read-access restricted to any data package in the archive for which an internal control structure of the first target system, being a cloned internal control structure of the source system, comprises the respective record with the respective package ID and the depot ID identifying the depot comprising the respective data package, where the depot ID is assigned a creator ID identifying the source system as creator of the depot, or the first target system as creator of the depot.

13. The computer system of claim 12, wherein the method further comprises:
creating a second depot in the archive by the first target system, the second depot being assigned a second creator ID identifying the first target system as a creator of the second depot, the first target system being provided with write-access restricted to any depot in the archive assigned with the second creator ID;
offloading one or more data packages of the first target system to the second depot; and
for each of the one or more data packages offloaded from the first target system to the second depot, writing a record to the internal control structure of the first target system, the record of the internal control structure of the first target system comprising a package ID identifying the data package offloaded from the first target system and a second depot ID identifying the second depot.

14. The computer system of claim 12, wherein the method further comprises:
cloning the first target system, including the internal control structure of the first target system, to a second target system, wherein:
the cloning comprises creating a physical replicate of the first target system in a form of the second target system, and
the second target system being provided with read-access restricted to any data package for which a cloned an internal control structure of the second target system, being a cloned internal control structure of the first target system, comprises the respective record with the respective data package ID and a depot ID identifying the depot comprising the data package, where the depot ID is assigned a creator ID identifying the source system as creator of the depot, the first target system as creator of the depot, or the second target system as creator of the depot.

15. The computer system of claim 14, wherein the method further comprises creating the multiple system landscape by performing a cascade of cloning procedures, each cloning procedure comprising cloning a preceding target system, including an internal control structure of the preceding target system, which has been generated in a preceding cloning procedure to a subsequent target system, wherein the cloning comprises creating a physical replicate of the preceding target system in a form of the subsequent target system.

16. The computer system of claim 12, wherein the archive further comprises a reference table comprising, for each data package of each depot of the archive a list of reference IDs identifying systems of the multiple system landscape comprising internal control structures with a record comprising the package ID and the depot ID.

17. A computer program product for cloning a source system of a multiple system landscape to a first target system of the multiple system landscape, the computer program product comprising:
a computer readable storage medium readable by a processing circuit and storing instructions for performing a method comprising:
creating, by the source system, a first depot in an archive comprising a plurality of depots, wherein:
the archive being accessible by a plurality of systems of the multiple system landscape including the source system and the first target system,
the first depot being assigned a first creator ID identifying the source system as a creator of the first depot, and
the source system being provided with write-access restricted to any depot assigned with the first creator ID in the archive,
offloading, by the source system, one or more data packages of the source system to the first depot;
for each of the one or more data packages offloaded from the source system to the first depot, writing, by the source system, a record to an internal control structure of the source system, wherein:
the record comprising a package ID identifying the data package and a first depot ID identifying the first depot, and
the source system being provided with read-access restricted to any data package in the archive for which the internal control structure of the source system comprises a respective record with a respective package ID identifying a respective data package and a depot ID identifying the depot comprising the respective data package, where the depot ID is assigned a creator ID identifying the source system as creator of the depot, cloning the source system, including the internal control structure of the source system, to the first target system, wherein:

the cloning comprises creating a physical replicate of the source system in a form of the first target system, and the first target system being provided with read-access restricted to any data package in the archive for which an internal control structure of the first target system, being a cloned internal control structure of the source system, comprises the respective record with the respective package ID and the depot ID identifying the depot comprising the respective data package, where the depot ID is assigned a creator ID identifying the source system as creator of the depot, or the first target system as creator of the depot.

18. The computer program product of claim 17, wherein the method further comprises:

creating a second depot in the archive by the first target system, the second depot being assigned a second creator ID identifying the first target system as a creator of the second depot, the first target system being provided with write-access restricted to any depot in the archive assigned with the second creator ID;

offloading one or more data packages of the first target system to the second depot; and for each of the one or more data packages offloaded from the first target system to the second depot, writing a record to the internal control structure of the first target system, the record of the internal control structure of the first target system comprising a package ID identifying the data package offloaded from the first target system and a second depot ID identifying the second depot.

19. The computer program product of claim 17, wherein the method further comprises:

cloning the first target system, including the internal control structure of the first target system, to a second target system, wherein:

the cloning comprises creating a physical replicate of the first target system in a form of the second target system, and the second target system being provided with read-access restricted to any data package for which an internal control structure of the second target system, being a cloned internal control structure of the first target system, comprises the respective record with the respective data package ID and a depot ID identifying the depot comprising the data package, where the depot ID is assigned a creator ID identifying the source system as creator of the depot, the first target system as creator of the depot, or the second target system as creator of the depot.

20. The computer program product of claim 17, wherein the archive further comprises a reference table comprising, for each data package of each depot of the archive, a list of reference IDs identifying systems of the multiple system landscape comprising internal control structures with a record comprising the package ID and the depot ID.

\* \* \* \* \*